(12) United States Patent
Faber et al.

(10) Patent No.: US 9,981,282 B2
(45) Date of Patent: May 29, 2018

(54) GLUE STICK FOR A HOT ADHESIVE DEVICE

(71) Applicant: Robert Bosch GmbH, Stuttgart (DE)

(72) Inventors: Marco Faber, Stuttgart (DE); Asmir Rojo, Unterensingen (DE); Timo Etzel, Neuhausen A.D.F. (DE)

(73) Assignee: Robert Bosch GmbH, Stuttgart (DE)

( * ) Notice: Subject to any disclaimer, the term of this patent is extended or adjusted under 35 U.S.C. 154(b) by 151 days.

(21) Appl. No.: 14/956,886

(22) Filed: Dec. 2, 2015

(65) Prior Publication Data

US 2016/0151802 A1    Jun. 2, 2016

(30) Foreign Application Priority Data

Dec. 2, 2014    (DE) .................. 10 2014 224 595

(51) Int. Cl.
*B05C 17/005* (2006.01)
*C09J 9/00* (2006.01)

(52) U.S. Cl.
CPC ......... *B05C 17/00526* (2013.01); *C09J 9/005* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,618,643 A | * | 10/1986 | von Voithenberg | ... C08G 63/18 524/430 |
| 4,986,680 A | * | 1/1991 | Melendy | ............. B05C 17/0053 222/146.5 |
| 5,664,701 A | * | 9/1997 | Massena | ........... B05C 17/00526 219/227 |
| 6,747,251 B1 | * | 6/2004 | Belanger | ........... B05C 17/00546 219/424 |

* cited by examiner

*Primary Examiner* — David Walczak
(74) *Attorney, Agent, or Firm* — Maginot, Moore & Beck LLP

(57) ABSTRACT

In a glue stick for a hot-glue device, in particular a glue gun, having an external contour which has a length and a diameter, a given ratio of length to diameter is in the range from 1:1 to 7:1.

6 Claims, 3 Drawing Sheets

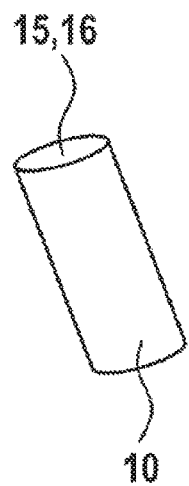
FIG. 2A
FIG. 2B
FIG. 2C
FIG. 2D

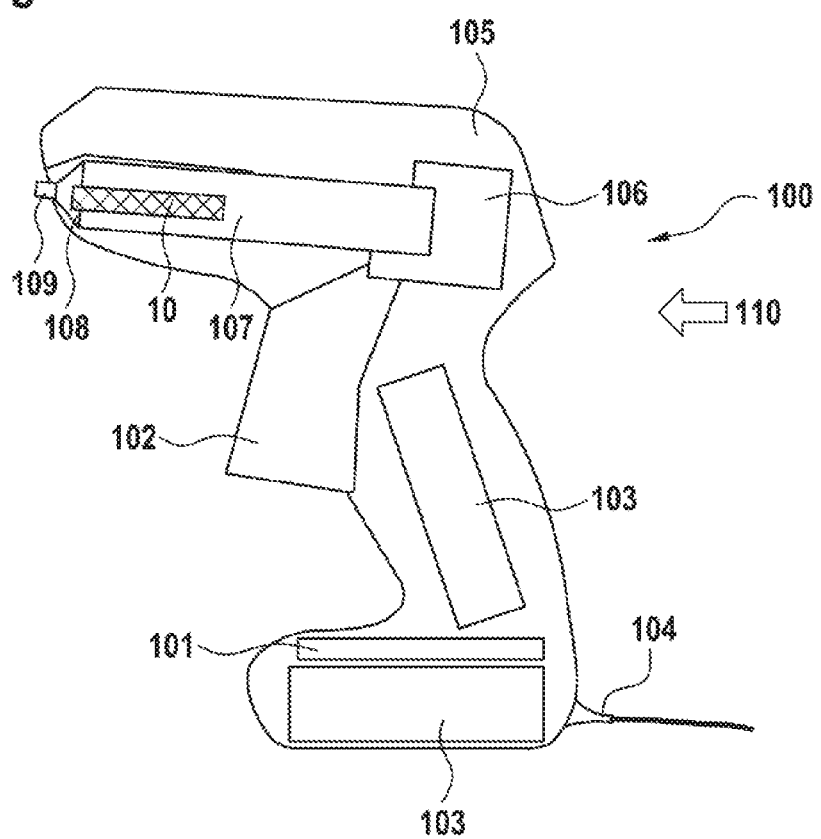

GLUE STICK FOR A HOT ADHESIVE DEVICE

This application claims priority under 35 U.S.C. § 119 to patent application number DE 10 2014 224 595.8, filed on Dec. 2, 2014 in Germany, the disclosure of which is incorporated herein by reference in its entirety.

BACKGROUND

The present disclosure relates to a glue stick for a hot-glue device, in particular for a glue gun, having an external contour which has a length and a diameter.

Glue sticks of this type, which have a diameter of about 7 mm and a length of at least 100 mm, are known from the prior art. Such glue sticks can, in a corresponding application, be pushed into a melting chamber in a hot-glue device and then be sectionally melted in this melting chamber.

However, a disadvantage with these known glue sticks is that they have a relatively long processing time of about 100 seconds. Furthermore, it is more difficult to use a plurality of different glue sticks in a hot-glue device in a corresponding application because there is no provision for the glue sticks to be exchanged in known hot-glue devices.

SUMMARY

Therefore, it is an object of the present disclosure to provide glue sticks which are distinguished by a short processing time, wherein it is intended to be at least made easier to exchange different glue sticks in a given application.

This problem is solved by a glue stick for a hot-glue device, in particular a glue gun, having an external contour which has a length and a diameter, wherein a given ratio of length to diameter is in the range from 1:1 to 7:1.

The present disclosure therefore makes it possible to provide comparatively compact glue sticks which are distinguished by a comparatively short processing time. Furthermore, the glue sticks according to the disclosure are able to be fully processed comparatively quickly, such that it is possible to exchange different glue sticks more frequently.

Advantageous developments and improvements of the glue stick specified in the following description are possible by way of the measures listed in the following description.

One advantageous development is that the external contour is formed at least substantially in a cylindrical manner.

A cylindrical external contour can be produced particularly easily and can moreover be introduced readily and securely into a corresponding melting chamber in a hot-glue device.

According to one embodiment, provision is made for the length to be in the range from 8 mm to 40 mm.

As a result of the shorter length, less energy is required to melt the glue stick, and so the processing time is shortened. It is particularly preferred here for the length to be in the range from 8 mm to 25 mm, since particularly compact and quick-melting glue sticks can then be produced.

According to a further embodiment, provision is made for the diameter to be in the range from 5 mm to 10 mm.

At such a diameter, both the glue stick itself and the melting chamber for receiving the glue stick can be formed in a compact manner. A diameter of 7 mm, which has proven successful with regard to reception and guidance in the case of glue sticks known from the prior art, is particularly preferred here.

According to one embodiment, the glue stick has a meltable adhesive which is meltable at a processing temperature in the range from 160° C. to 200° C.

In this way, the glue stick can also be processed in hot-glue devices known from the prior art and does not require a special solution with regard to the hot-glue device.

It is particularly preferred here for the meltable adhesive to be meltable at a processing temperature in the range from 160° C. to 200° C. for a processing time in the range from 5 seconds to 90 seconds. As a result, the processing time can be considerably shortened compared with glue sticks known from the prior art and the hot-glue device is ready for use more quickly.

It is very particularly preferred here for the processing time to be in the range from 5 seconds to 40 seconds. As a result, the heating-up time in the hot-glue device can be more than halved and thus significantly shortened.

According to a further development, provision is made for the meltable adhesive to be provided with a coloring or a glitter effect.

As a result, colorful glued joints or glued joints having a glitter effect can be formed. This is particularly advantageous in conjunction with the compact glue sticks according to the disclosure, since a quick change between colors or glitter effects is possible as a result.

Furthermore, the above problem is solved by a hot-glue device, in particular a glue gun, for processing a glue stick according to the disclosure. Thus, the glue sticks according to the disclosure can be processed in an easy and uncomplicated manner.

BRIEF DESCRIPTION OF THE DRAWINGS

The disclosure is described in more detail in the following description by way of exemplary embodiments illustrated in the drawings, in which:

FIGS. 2A, 2B, 2C, and 2D show a plurality of embodiments of glue sticks according to the disclosure having a colored, meltable adhesive, and FIG. 3 shows a hot-glue device for processing a glue stick according to the disclosure.

DETAILED DESCRIPTION

Figure 1A:
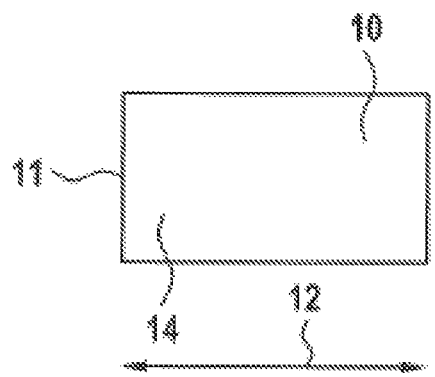
FIGS. 1A and 1B show a schematic view of a glue stick according to the disclosure, in side view and in plan view.
Figure 1B:
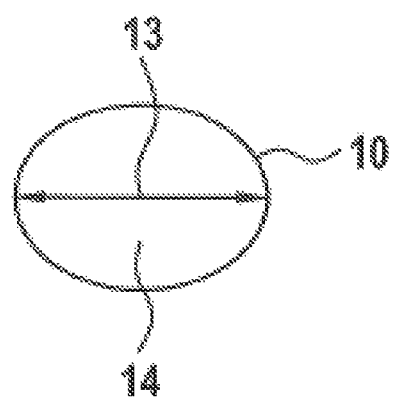

FIGS. 1A and 1B show a glue stick 10 according to the disclosure having an external contour 11 which is configured at least substantially in a cylindrical manner according to one embodiment and, as illustrated, has a length 12 and a diameter 13, wherein a given ratio of length 12 to diameter 13 is preferably in the range from 1:1 to 7:1. A glue stick 10 in which the ratio of length 12 to diameter 13 is approximately in the range 2.5:1 is shown by way of example, but shorter or longer glue sticks 10 are also conceivable.

Preferably, the length 12 is in the range from 8 mm to 40 mm and, particularly preferably, in the range from 8 mm to 25 mm. The diameter 13 is preferably in the range from 5 mm to 10 mm and, particularly preferably, is at least approximately 7 mm.

According to one embodiment, the glue stick 10 has a meltable adhesive 14 which is meltable at a processing temperature in the range from 160° C. to 200° C. Preferably, the meltable adhesive 14 is meltable at this processing temperature in the range from 160° C. to 200° C. for a processing time in the range from 5 seconds to 90 seconds and, particularly preferably, for a processing time in the range from 5 seconds to 40 seconds.

FIGS. 2A, 2B, 2C, and 2D show various exemplary embodiments of the glue stick 10 from FIGS. 1A and 1B, wherein the glue stick 10 from FIGS. 1A and 1B, or the meltable adhesive 14 thereof, is not just configured in a white or milky and monochrome manner but rather the meltable adhesive 14 can be provided with a coloring 15 and/or a glitter effect 16.

Three colored glue sticks 10 are illustrated by way of example in FIGS. 2A, 2B, and 2C, each with a glitter effect 16 and/or coloring 15. However, it is in principle possible to introduce a coloring 15 without a glitter effect 16, or a glitter effect 16 without coloring 15 into the meltable adhesive 14.

FIG. 3 schematically shows a hot-glue device 100 in the form of a glue gun 110 for processing the glue stick 10 according to the disclosure from FIGS. 1A, 1B, 2A, 2B, 2C, and 2D. The glue gun 110 has for example a housing 105 in which a melting chamber 107 is arranged. This melting chamber 107 is preferably configured in a largely cylindrical manner and has, at one end, an outlet nozzle 108 with an outlet opening 109 from which the adhesive 14 of a glue stick 10 from FIG. 1A, 1B, 2A, 2B, 2C, or 2D, which has been introduced into the melting chamber 107 and melted, can emerge. Also provided is a feeder 106 which can press on the glue stick 10 and thus presses the meltable or melted adhesive 14 in the direction of the outlet opening 109.

One or more battery packs 103 and control electronics 101 are furthermore arranged in the housing 105. As an alternative or in addition to the battery pack 103, the glue gun 110 can also be supplied with power through an electric power cable 104.

The glue gun 110 is operable via an actuation device 102 arranged on the housing 105. As a result of the smaller and more compact glue sticks 10, either the melting chamber 107 can be designed in a smaller manner or the processing times can be reduced for the same heat output of the melting chamber 107.

As an alternative or in addition, provision is made for a plurality of glue sticks 10, in particular a plurality of glue sticks 10 of different types or different colors, to be able to be stored in the housing 105.

The invention claimed is:

1. A glue stick for a hot-glue device, comprising:
a meltable adhesive with an external contour having a length and a diameter,
wherein the length is in a range from 8 mm to 25 mm,
wherein a given ratio of the length to the diameter is in a range from 1:1 to 7:1, and
wherein the meltable adhesive is meltable at a processing temperature in a range from 160° C. to 200° C. for a processing time in a range from 5 seconds to 90 seconds.

2. The glue stick according to claim 1, wherein the external contour is formed at least substantially in a cylindrical manner.

3. The glue stick according to claim 1, wherein the diameter is in a range from 5 mm to 10 mm.

4. The glue stick according to claim 3, wherein the diameter is 7 mm.

5. The glue stick according to claim 1, wherein the meltable adhesive is provided with at least one of a coloring and a glitter effect.

6. The glue stick according to claim 1, wherein the processing time is in a range from 5 seconds to 40 seconds.

* * * * *